United States Patent [19]
Cline et al.

[11] Patent Number: 5,263,552
[45] Date of Patent: Nov. 23, 1993

[54] AUTOMATIC LUBRICATION SYSTEM FOR AN INDUSTRIAL ROTARY DRIVE

[75] Inventors: David M. Cline, Simpsonville; William B. Richmond; Kenneth S. Rice, both of Greenville, all of S.C.

[73] Assignee: The Cline Company, Greenville, S.C.

[21] Appl. No.: 908,044

[22] Filed: Jul. 6, 1992

[51] Int. Cl.$^5$ .............................................. F01M 1/00
[52] U.S. Cl. ........................ 184/6.19; 184/6; 184/6.28; 464/14; 464/13; 74/468; 74/606 A
[58] Field of Search ............... 184/6, 6.19, 6.21, 6.28; 464/13, 14; 74/467, 468, 606 A

[56] References Cited

U.S. PATENT DOCUMENTS

| | | | |
|---|---|---|---|
| 2,876,636 | 3/1959 | Thackeray | 464/14 |
| 3,785,460 | 1/1974 | Smith et al. | 464/14 |
| 4,113,060 | 9/1978 | Smith | 184/6 |
| 4,217,794 | 8/1980 | Yasui et al. | 74/467 |
| 4,583,413 | 4/1986 | Lack | 74/467 |

*Primary Examiner*—Thomas E. Denion
*Attorney, Agent, or Firm*—Cort Flint

[57] ABSTRACT

Apparatus and method for automatically and continuously lubricating a rotary drive of an industrial drive such as a pump, roll, or other driven member is disclosed. The apparatus includes a rotary drive coupling assembly that is connected between an input shaft and an output shaft which drives the driven member. There is an axial bore drilled through the center of an input shaft and a transverse bore which communicates with the axial bore and terminates at an exterior of the input shaft. The shaft coupling assembly preferably comprises a first shaft coupling and a second shaft coupling which are connected by a connecting member. A bridge conduit spans the first shaft coupling and terminates at a manifold which is carried about the connecting member. From the manifold, a plurality of injector valves distribute pressurized lubricant delivered by a timed pressure pump to the shaft couplings. Preferably the shaft couplings comprise universal type joint couplings having a plurality of bearings. Dispensing lines carry the pressurized lubricant from the injector valves to the bearings. In this manner, a timed and controlled amount of pressurized lubricant is delivered to the lubrication points of the rotary drive continuously during operations. In alternate embodiments of the invention, different types of shaft couplings are utilized as well as drive arrangements, each of which is provided with lubrication points to which pressurized lubricant is dispensed.

37 Claims, 4 Drawing Sheets

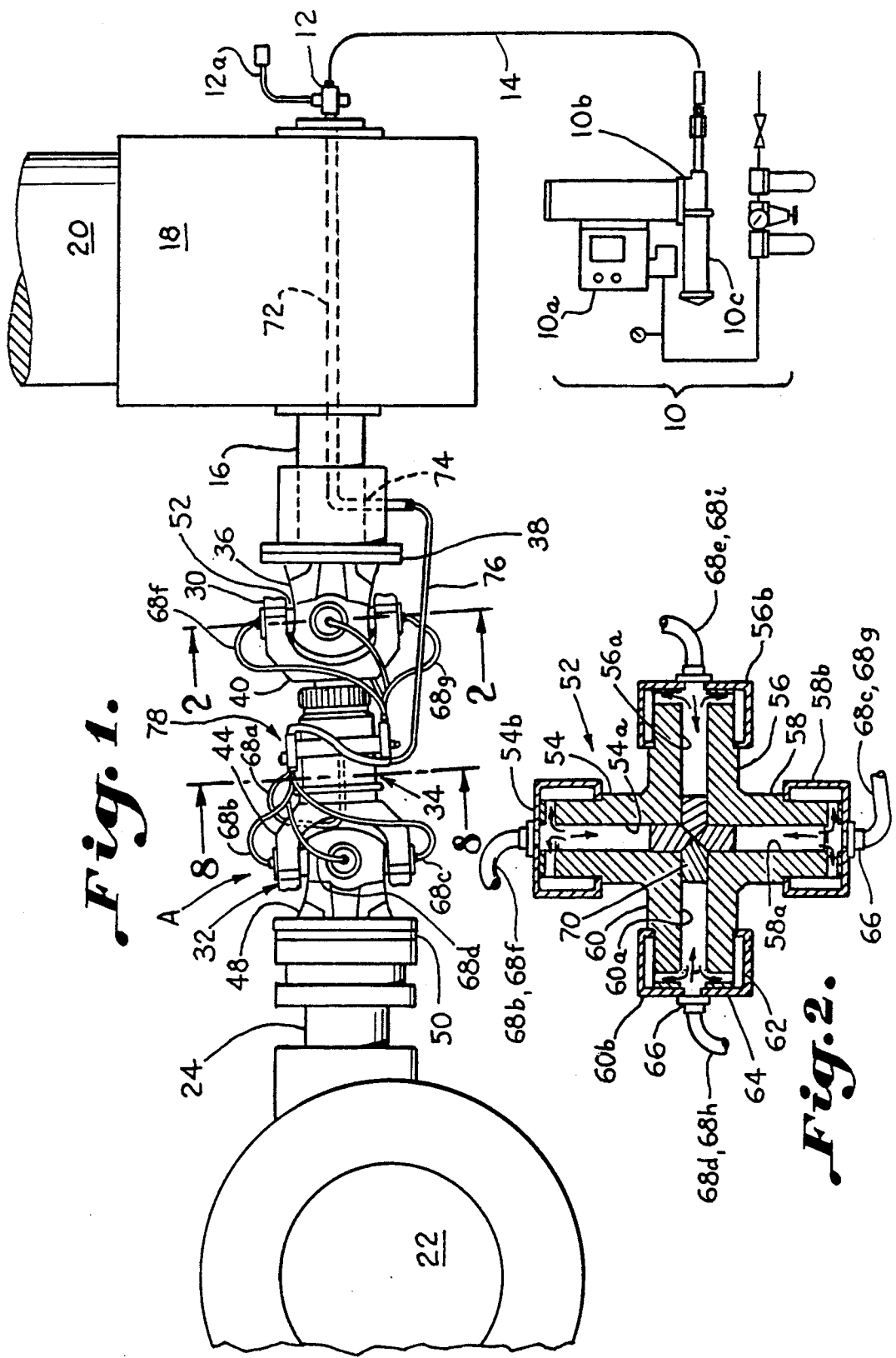

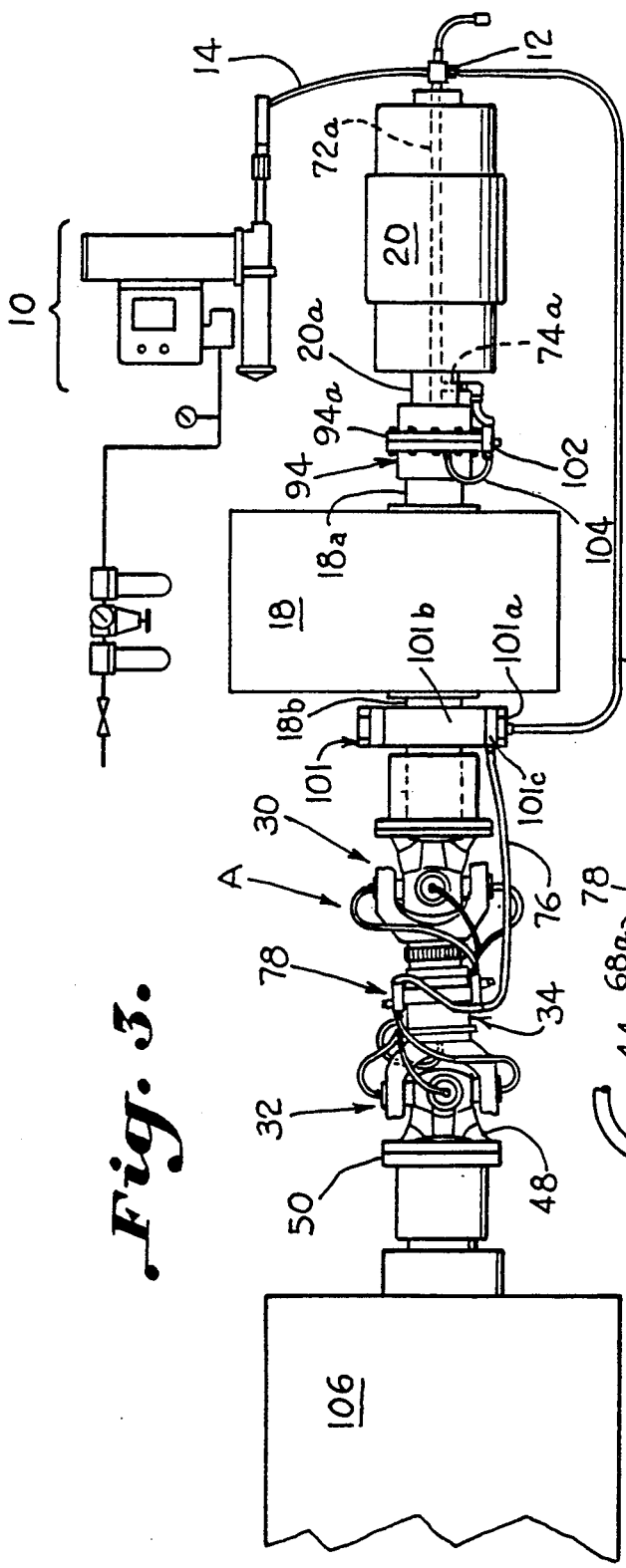
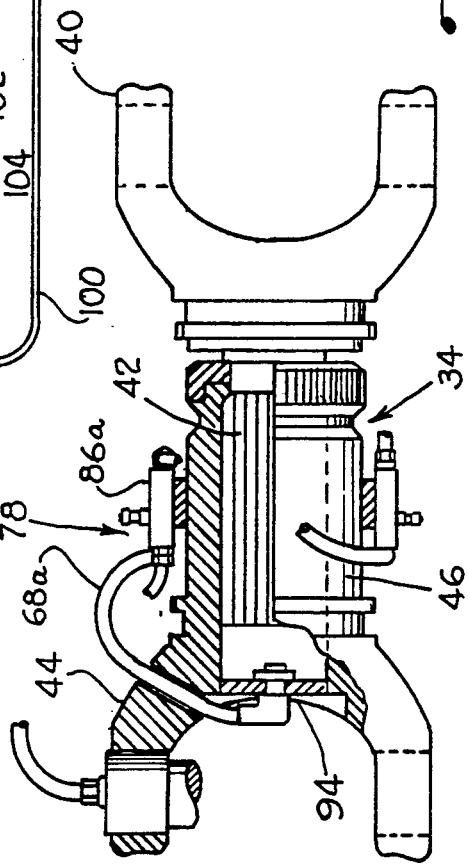

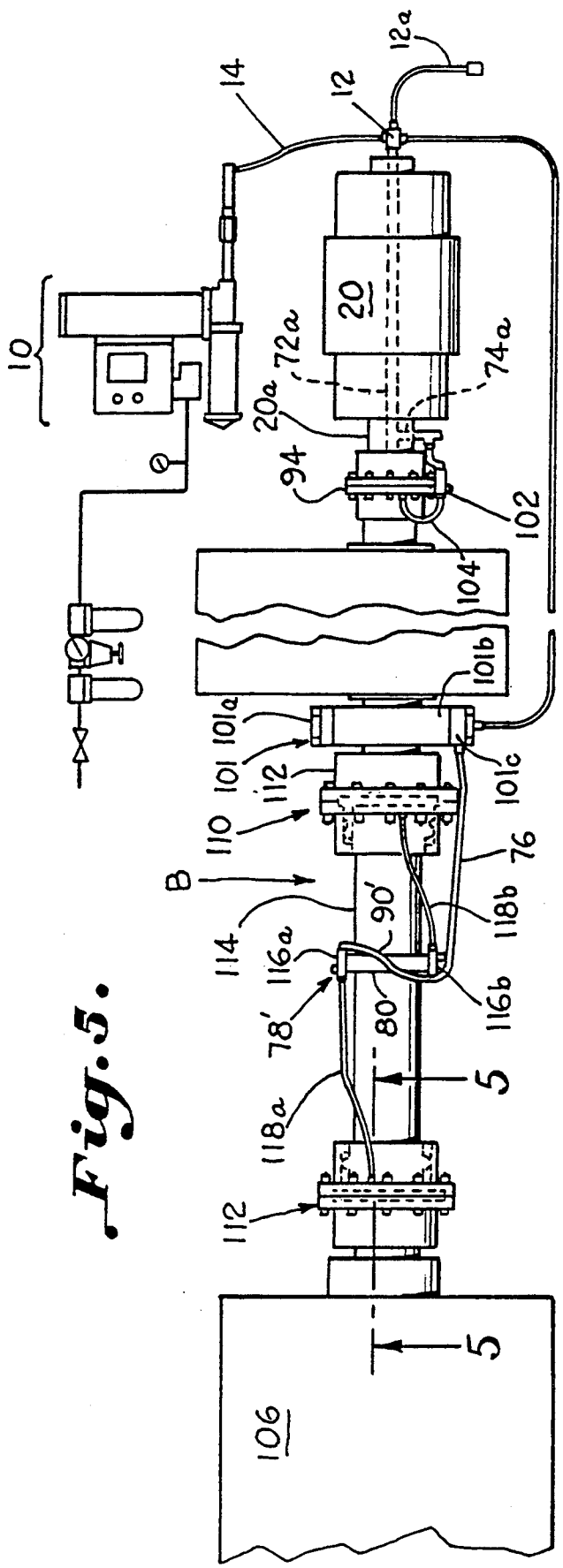
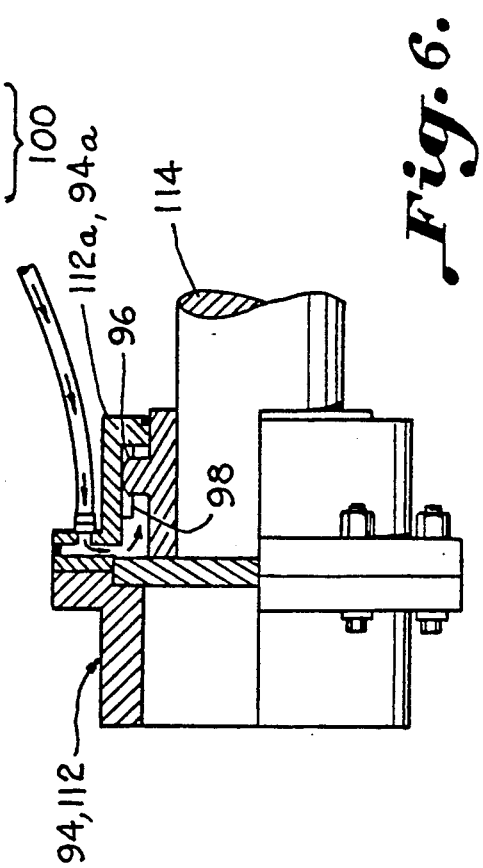

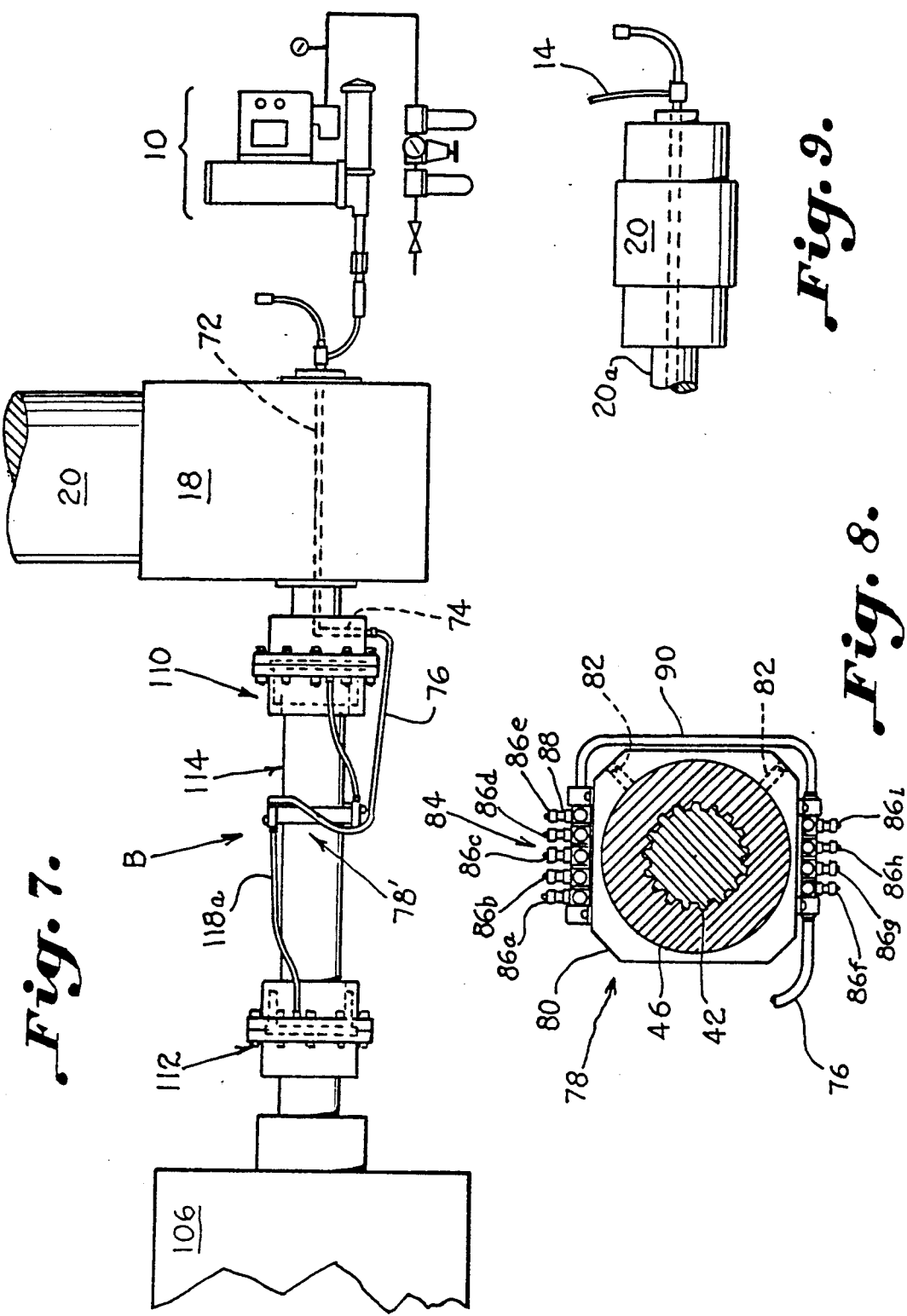

AUTOMATIC LUBRICATION SYSTEM FOR AN INDUSTRIAL ROTARY DRIVE

BACKGROUND OF THE INVENTION

The invention relates to an apparatus and method for automatically and continuously lubricating an industrial rotary drive during operation.

Many industrial production processes involve the continuous operation of rotary machinery. Full production depends on the continuous and reliable operation of the machinery without breakdowns. For example, in the production of many polymer extrusions and films, it is necessary to continuously drive a polymer pump with a rotary drive. The rotary drive typically includes a pump shaft which is connected to a motor shaft. The connection between the pump shaft and motor shaft typically includes a universal or gear shaft coupling. The coupling may include one or more universal joint couplings or gear couplings. Either type coupling has numerous points which must be lubricated for continuous and reliable operation. In the past, suitable systems and techniques have not been provided for such lubrication. If the production is stopped to manually lubricate the couplings, time is lost since there is considerable downtime involved with stopping and starting the production process. Furthermore, it is difficult to achieve the same quality of product when the process is stopped and restarted. Invariably, there will be differences in the product quality with the cessation and resumption of the production process because of the many variables involved in the production process and the difficulty in reestablishing the parameters after the process is resumed under which the process was previously being run. If the production is not stopped for servicing of the couplings, a complete failure of one or more bearings or couplings may occur. If a bearing or coupling failure occurs, considerable downtime is required in order to disassemble the equipment for the repair and replacement of the broken parts. Typically, the disassembly of the production machinery, drive shafts, and couplings requires hours or days to repair or replace. During this time considerable production is lost and it is difficult to achieve the same quality of product upon resumption.

Prior systems have been developed for lubricating rotating shafts during operation, for example, U.S. Pat. No. 3,456,760 discloses a pair of driven rolls which are connected to a drive shaft through a swivel joint which may be lubricated continuously during operation through an axial bore which communicates between a source of oil and the joint. U.S. Pat. No. 3,991,855 discloses an automatic greaser for a universal joint that enables the joint to be lubricated continuously during rotation. However, none of the above prior apparatus and methods for greasing a rotary drive is entirely suitable for large industrial rotary drives utilized in the industrial production of polymer products and the like.

Accordingly, an important object of the present invention is to provide an apparatus method for automatically lubricating the bearings of shaft couplings associated with an industrial rotary drive continuously during operation.

Another important object of the present invention is to provide a lubricating system for an industrial rotary drive which continuously dispenses a prescribed amount of lubricant to the bearing joints of shaft couplings in the rotary drive during operation.

Still, another important object of the present invention is to provide an apparatus and method for automatically and continuously lubricating shaft couplings of an industrial rotary drive during operation which provides for periodic dispensing of a prescribed amount of lubricant to multiple points along the rotary drive from a logistical manifolded location.

SUMMARY OF THE INVENTION

The above objectives are accomplished according to the present invention by providing an industrial rotary drive and an automatic lubrication system having a pressurized pump for delivering pressurized lubricant. A first shaft coupling and a second shaft coupling are included in the rotary drive and are spaced apart. There is a connecting member interconnecting the first and second shaft couplings. An input shaft is connected to the first coupling and an output shaft is connected to the second coupling. An axial bore extends internally through the input shaft which receives lubricant from the pump. A transverse bore is formed in the input shaft which communicates with the axial bore and with the exterior of the input shaft. A bridge conduit communicates with the transverse bore and spans the first shaft coupling. A manifold is mounted on the connecting member in fluid communication with the bridge conduit and a plurality of injection valves are carried by the manifold in fluid communication with the manifold for receiving pressurized lubricant. A plurality of dispensing lines are connected in fluid communication with the valves and to the first and second shaft couplings for dispensing the pressurized lubricant to the first and second shaft couplings. Preferably, the first and second shaft couplings include universal yoke couplings having a plurality of universal joint bearings. The dispensing lines are connected to the universal joint bearings. The injector valves deliver a prescribed amount of pressurized lubricant to the universal joint bearings when the pressurized pump is energized. The first yoke coupling includes an input yoke attached to the input shaft and an output yoke connected to the connector member. The second yoke coupling includes an input yoke connected to the connector member and an output yoke connected to the output shaft. Cross and bearing assemblies connect the input and output yokes of the first and second yoke couplings each having four of the universal joint bearings.

The first and second couplings may also include first and second floating gear couplings. The gear couplings have a housing with an interior gear and the connecting member includes an intermediate connecting shaft with external gear teeth meshing with the interior gear. A lubricant dispensing line communicates with an interior of the housing to dispense pressurized lubricant to the gears.

The rotary drive may include a drive motor or a coupled motor to a gear reducer by a third shaft coupling. There is a second transverse passage formed in the motor drive shaft and a second bridge conduit which bridges the third shaft coupling and terminates in a third transverse shaft which communicates with an axial bore in a shaft of the gear reducer. The third shaft coupling may include a floater gear coupling.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 is a plan view of a rotary drive and automatic lubrication system for an industrial process according to the invention;

FIG. 2 is a sectional view of a cross and bearing assembly of a shaft coupling utilized in the system and drive of the present invention;

FIG. 3 is a side elevation of an alternate embodiment of a automatic lubrication system and a rotary drive for an industrial process according to the invention;

FIG. 4 is an enlarged partial section illustrating a pair of shaft couplings interconnected by a splined connecting member according to the invention;

FIG. 5 is an elevation illustrating another alternate embodiment of an automatic lubrication system and rotary drive according to the invention;

FIG. 6 is a partial section illustrating a gear coupling utilized in accordance with the present invention;

FIG. 7 is another alternate embodiment of an automatic lubrication system and rotary drive for an industrial process according to the invention;

FIG. 8 is a front elevation of a manifold and collar mount by which a plurality of injector valves are manifolded in an automatic lubrication system for a rotary drive according to the present invention; and FIG. 9 is an elevation of a drive motor for direct drive of an automatic lubrication system according to the invention.

DESCRIPTION OF THE PREFERRED EMBODIMENT

Referring now to the drawings, a rotary industrial drive and automatic lubrication system for continuously lubricating the rotary drive during operation will now be described.

Referring to FIG. 1, an automatic lubricating pump is illustrated schematically at 10, which is connected to a rotary union 12 by a suitable flexible hose 14. Rotary union 12 is affixed to a shaft 16 of a gear reducer 18, which shaft is analogous to a motor shaft. Gear reducer 18 is driven by a drive motor 20 having a 90 degree drive arrangement to shaft 16 of the gear reducer. At the output end of the rotary drive, there is a driven member 22. The driven member may be any driven equipment such as a pump, as illustrated, or rolls, agitators, etc. There is a pump shaft 24 which drives pump 22. Connected between shaft 16 and pump shaft 24 is a rotary shaft coupling assembly designated generally as A. In the illustrated embodiment of FIG. 1, shaft coupling assembly A includes a first shaft coupling means 30 and a second shaft coupling means 32 connected by a connecting means 34. For purposes of this description, driving shaft 16 will be referred to as an input shaft means and driven pump shaft 24 will be referred to as an output shaft means. In FIG. 1, first and second shaft coupling means 30 and 32 are illustrated in the form of a universal joint. There is a first yoke coupling means having an input yoke 36 attached to a flange 38 secured to input shaft means 16; and an output yoke 40 attached to a splined shaft 42 of connector means 34, as can best be seen in FIG. 4. There is a second yoke coupling means which includes an input yoke 44 attached to a splined hub 46 of splinal connector means 34 and a output yoke 48 connected to a flange 50 which is affixed to output shaft means 24.

As can best be seen in FIG. 2, a cross and bearing assembly, designated generally as 52, interconnects each of the input and output yokes of the first and second yoke couplings 30 and 32 in a conventional manner. Typically, such a cross and bearing assembly includes four arms 54, 56, 58 and 60. The cross arms have axial passages 54a, 56a, 58a and 60a. There is a joint bearing 54b, 56b, 58b and 60b formed at the end of each respective arm. Since the joint bearings are identical and conventional, only one will be described to an extent necessary for the understanding of the present invention. For example, joint bearing 60b includes a bearing 62 and a bearing cap 64 (FIG. 2). There is a lubricant fitting 66 to which a lubricant line 68 is attached. There is a plug means 70 inserted in the middle of the cross arm assembly which plugs each axial passageway. In this manner, lubricant which is admitted into the axial passageways of the cross arm and bearing assembly flows through the axial passage to the plug, reverses its direction, passes outwardly through the bearing 62 and bearing cap 64 to purge the air in each. This is an expedient to an automatic and continuous lubricating system of the present invention.

In accordance with the present invention, as illustrated in FIG. 1, there is an axial bore 72 formed in shaft 16 which communicates with rotary union 12 and hence pressurized lubricant in hose 14. Axial bore 72 is a rifle-drilled bore formed centrally through shaft 16. There is a transverse or inclined bore 74 which communicates with bore 72 and the exterior of shaft 16. Transverse bore 74 exits a hub on shaft 16 and communicates with a bridge conduit 76 which spans first shaft coupling 30 and terminates at a manifold means 78 carried about connector means 34. As can best be seen in FIG. 8, manifold means comprises a mounting collar 80 mounted concentrically about splined hub 46 and is secured thereto by means of set screws 82. Valve means, designated generally 84 communicates with the manifold means and with a plurality of lubricant dispensing lines 68 connected to the joint bearings of the shaft coupling means. For this purpose, valve means 84 preferably includes a plurality of injector valves 86a through 86i (FIG. 8). The injector valves may be any suitable spring loaded injector valves. A suitable automatic pump system 10 and injector valves 86 are available from the Lincoln Company of St. Louis, Mo. The automatic pump system is referred to as the Centro Matic system and the injector valves are referred to as series SL-32. The pump system includes a timer 10a and a single stroke pump 10b which is actuated by an air cylinder 10c (FIG. 1). Air is admitted to the air cylinder by a solenoid valve (not shown) controlled by timer 10a in a conventional manner. In accordance with such a system, a prescribed amount of lubricant may be dispensed by the pump at a prescribed pressure as determined by the timer 10a. For example, a prescribed amount of lubricant at a controlled pressure may be dispensed from the pump daily, or at any other periodic interval desired. The automatic system may be operated manually also. Manual lubrication of the shaft assembly can be performed if the automatic system has an equipment failure. Manual, meaning a person can lubricate the unit with a hand held grease gun (not shown) through a pig tail fitting 12a connected to rotary union 12 while the rotary drive is rotating. Lubrication is still given "automatically" to each bearing while the drive shaft is rotating, which is the key. Injector valves 86 include an adjustment at 88 which allows the amount of lubricant injected by the valve to be controlled. The injector valves are manifolded and are interconnected by a conduit 90 which communicates with bridge conduit 76 (FIGS. 1 and 8).

As can best be seen in FIGS. 1 and 2, dispensing or feed lines 68a through 68i are connected between the respective injector valves in 86a through 86i and different lubrication points in the rotary drive (FIG. 8). There is a lubricating point at each of the bearing joints 54b through 60b (FIG. 2) of each of the cross and bearing assemblies 52 of shaft couplings 30 and 32. Accordingly, there are eight lubricating points for the bearings. In addition, there is a lubricating point within splinal connector means 34, as can best be seen in FIG. 4. Thus, there are nine injector valves manifolded on the mounting collar 80 (FIG. 8). The top manifold of injectors includes five injector valves 86a–86e. One of the injector valves 86a is for the splined connector member 34 (FIGS. 1 and 4). The bottom manifold of injectors includes four injector valves 86f–86i. The remaining injector valves are connected to the lubricating points at the cross and bearing arm assembly 52. For example, valve 86a may be attached through a line 68a to a fitting 94 which communicates with the interior of splined coupling member 34. Injector valves 86b and 86f are connected to the top arm bearing joints of the bearing arm bearing joints, injector valves 86c and 86g are connected to the bottom arm bearing joints, and injector valves 86d and 86h are connected to the left arm bearing joints (FIG. 2). In splined connector member 34, a working clearance between the interior splines 46 of the hub and the exterior splines 42 of the shaft allows purging of air as pressurized lubricant is admitted through the fitting 94 (FIG. 4).

As can best be seen in FIG. 3, an alternate embodiment of the invention of FIG. 1 is illustrated wherein the drive means includes drive motor 20 coupled in line with gear reducer 18 by means of a third shaft coupling means 94. In this case, instead of drive motor 20 being coupled to gear reducer 18 by means of a 90 degree drive, as is the case of the embodiment in FIG. 1, the motor shaft 20a and reducer shaft 18a are coupled by the shaft coupling 94. Preferably, third shaft coupling 94 is a floating gear coupling. Any conventional lubricated coupling may be utilized such as that illustrated in FIG. 6 wherein each of shafts 20a and 18a include external gear teeth 96 and gear coupling housing 94a includes internal gear teeth 98. For this purpose, an axial bore is formed centrally through the motor shaft 20a in two parts, namely at 72a and 74a. There is a second bridge conduit 100 which communicates with rotary union 12 and a rotary shaft seal 101 affixed to the output end of shaft 18b since the typical gear reducer box cannot be drilled continuously straight through. Rotary shaft seal 101 includes rotary inner part 101a which rotates with shaft 18a and a non-rotary part 101b connected to bridge conduit 100. First bridge conduit 76 is fitted into rotary part 101a and rotates with the rotary drive. Communication between conduit 100 and 76 is through a groove 101c in the rotary shaft seal. A suitable rotary shaft seal 101 is available from Scott Rotary Seals, Inc. of Hinsdale, N.Y. An additional lubricating point is provided in the embodiment of FIG. 3 by an injector valve 102 which injects pressurized lubricant into an interior of gear housing 94a through a suitable fitting and dispensing line 104. This lubricates the intermeshed gear teeth of the floating gear coupling. In the embodiment of FIG. 3, a driven roll 106 is illustrated rather than a driven pump 22 as in the embodiment of FIG. 1.

Referring now to FIG. 5, an alternate embodiment of the invention is illustrated wherein the first and second shaft coupling means are provided by first gear coupling 110 and a second gear coupling 112. Connecting means for connecting the first shaft coupling comprises an intermediate shaft 114, which interconnects shaft couplings 110 and 112. First and second gear shaft couplings 110 and 112 are identical except that they are in reverse directions. Accordingly, only gear housing 112 will be described. As can best be seen in FIG. 6, second gear shaft coupling 112 includes a gear housing 112a. Each end of intermediate connector shaft 114 includes gear teeth 96 which mesh with internal gear teeth 98 inside the gear coupling. Manifold means 78, is carried about intermediate shaft 114 and valve means are provided in fluid communication with the manifold means for distributing pressurized lubricant into the interior of gear housing 112a. For this purpose, there is only a single dispensing line for dispensing pressurized lubricant to each floating gear coupling. There is an injector valve 116a and an injector valve 116b carried on mounting collar 80 which are in fluid communication with bridge conduit 76 by way of a manifold conduit 90'. Dispensing lines 118a and 118b dispense pressurized lubricant to second shaft coupling 112 and first shaft coupling 110, respectively. Injector valves 116a and 116b may be identical to injector valves 86 illustrated in FIG. 8. Gear couplings 94, 110 and 112 may be any conventional floating gear coupling. Pressurized lubricant dispensed through the dispensing lines is forced between the gear teeth to purge air from the housing.

FIG. 7, an alternate embodiment of the invention, is illustrated which is identical to FIG. 5, except that third shaft coupling 94 is omitted. Drive motor 20 drives the gear reducer 18 through a 90 degree drive as is the case of the embodiment as illustrated in FIG. 1.

In practice, the automatic lubrication system and method of the present invention may be retrofitted to an existing industrial rotary drive or may be embodied in manufactured rotary drives.

In accordance with the invention, a method of automatically lubricating a rotary drive having an input shaft; a first shaft coupling; a second shaft coupling connected to an output shaft of the rotary drive, and an intermediate connector interconnecting the first and second shaft couplings includes providing a pump for delivery of a pressurized lubricant, and forming a passage rifle-drilled centrally through the input shaft. Next the method includes forming a transverse bore in fluid communication with the axial bore and providing a bridge conduit which spans the first shaft coupling communicating with the transverse bore. The method includes mounting a manifold about the intermediate connector and providing injector valves connected to the manifold for fluid communication therewith. Next, a plurality of dispensing lines are connected to the valves and to the shaft couplings for dispensing pressurized lubricant from the lubricant pump to the shaft couplings. The method preferably includes mounting a plurality of injection valves around the connecting shaft, and manifolding the injector valves by interconnecting the injector valves and the bridge conduit.

In achieving the objectives of the invention, it is anticipated that such a rotary drive and lubrication system can be operated continuously for five years or longer before servicing is required. This results in a considerable enhancement of production in the industrial processes of the type using such rotary drives.

While a preferred embodiment of the invention has been described using specific terms, such description is for illustrative purposes only, and it is to be understood that changes and variation may be made without departing from the spirit or scope of the following claims.

What is claimed is:

1. A rotary drive system having an automatic lubrication system for lubricating said rotary drive while rotating including a remote pump means for delivering pressurized lubricant, said system comprising:
   a first shaft coupling means included in said rotary drive;
   a second shaft coupling means included in said rotary drive and spaced from said first shaft coupling means;
   connecting means connecting said first and second shaft coupling means;
   an input shaft means connected to said first coupling means;
   an output shaft means connected to said second coupling means;
   manifold means mounted on said connecting means downstream from said remote pump means;
   a conduit means for communicating lubricant from said pump means to said manifold means;
   valve means in fluid communication with said manifold means for receiving pressurized lubricant delivered by said conduit means; and
   a plurality of dispensing lines in fluid communication with said valve means and connected to said first and second shaft couplings for dispensing said pressurized lubricant to said first and second shaft couplings.

2. The apparatus of claim 1 wherein said conduit means includes a first bridge conduit spanning said first shaft coupling means in a fluid communication with said manifold means.

3. The apparatus of claim 2 wherein said conduit means includes a second bridge conduit in fluid communication with said first bridge conduit.

4. The apparatus of claim 3 including a rotary shaft seal carried by said input shaft means having a nonrotary part connected to said second bridge conduit and a rotary part connected to said first bridge conduit and through which said bridge conduits communicate.

5. The apparatuses of claim 3 wherein said rotary drive comprises: a drive motor;
   a gear reducer; and
   a third shaft coupling means connected between said drive motor and gear reducer.

6. The apparatus of claim 5 wherein said second bridge conduit bridges said first coupling means; and said second bridge conduit communicates with said pump means through a rotary union carried on a drive shaft of said drive motor;

7. The apparatus of claim 2 wherein said conduit means includes:
   an axial bore extending internally through at least a part of said input shaft means;
   a transverse bore formed in said input shaft means communicating with said axial bore and with the exterior of said input shaft means; and
   said first bridge conduit communicating said transverse passage with said manifold means.

8. The apparatus of claim 1 wherein said first and second shaft coupling means include a plurality of universal joint bearings.

9. The apparatus of claim 8 wherein said dispensing lines are connected to said universal joint bearings.

10. The apparatus of claim 9 wherein said valve means includes a plurality of injector valves connected to said dispensing lines which deliver a prescribed amount of said pressurized lubricant to said universal joint bearings when said pump means is energized.

11. The apparatus of claim 10 wherein each of said first and second shaft coupling means comprises:
    a first yoke coupling having an input yoke attached to said input shaft means and an output yoke connected to said connecting means;
    a second yoke coupling having an input yoke connected to said connecting means and an output yoke connected to said output shaft means; and
    cross and bearing assemblies connecting said input and output yokes of said first and second yoke couplings, and each said bearing assembly having four of said universal joint bearings.

12. The apparatus of claim 11 wherein said cross and bearing assemblies include four cross arms having axial passages; and a plug means inserted in said passages of said cross arms to prevent communication between said passages so that pressurized lubricant admitted to said bearings is forced through said passages in a first direction until said plug means is reached and subsequently reverses direction to flow in a second opposite direction through said passages to purge air outwardly through said joint bearings.

13. The apparatus of claim 12 wherein said rotary drive includes a drive motor, a drive shaft, a gear box, a gear box shaft, and a third shaft coupling connecting said drive shaft to said gear box shaft; and a transverse passage formed in said drive shaft communicating with said third shaft coupling.

14. The apparatus of claim 11 wherein said connecting means includes a splined shaft having exterior splines connected to said first yoke coupling; and said connecting means includes a splined hub having internal splines connected to said second yoke coupling which receives said splined shaft with said external and internal splines enmeshed.

15. The apparatus of claim 14 wherein one of said dispensing lines communicates with the interior of s id splined hub for delivering pressurized lubricant to said enmeshed splines of said splined hub and splined shaft.

16. The apparatus of claim 2 wherein said first an second coupling means include first and second gear couplings; each of said gear couplings having a housing with interior gear means and said connecting means includes a connecting shaft with external gear means meshing with interior gear means, and said dispensing lines communicating with an interior of said housing to dispense pressurized lubricant to said meshing gear means.

17. The apparatus of claim 16 wherein said first and second gear couplings are spaced apart and are interconnected by said connecting shaft with said first bridge conduit spanning said first gear coupling.

18. The apparatus of claim 17 wherein said interior gear means comprises a ring gear and said exterior gear means comprises at least one gear tooth which meshes with said ring gear; and said pressurized lubricant is admitted to said coupling for lubrication of said gear ring and gear tooth.

19. The apparatus of claim 1 wherein said valve means comprises a plurality of injector valves which deliver a predetermined amount of lubricant when said pressurized pump means is energized.

20. The apparatus of claim 2 wherein said manifold means comprises a collar mount carried about said connecting means for rotation with said connecting means; and said valve means comprises a plurality of injection valves carried by said collar mount which are manifolded and connected to said first bridge conduit and to said dispensing lines for distributing said lubricant to said first and second couplings.

21. The apparatus of claim 20 wherein said connecting means comprises a splined coupling having intermeshing splines; and a dispensing line connected to one of said injector valves and an interior of said splined coupling to dispense pressurized lubricant to said splines.

22. The apparatus of claim 20 wherein said connecting means comprises an intermediate shaft extending between said first and second couplings.

23. An automatic lubricating and rotary drive system comprising:
a remote lubricant pump;
an input shaft means;
an output shaft means;
at least one shaft coupling connecting said input and output shaft means, said at least one shaft coupling having a plurality of joint bearings;
conduit means for communicating with said lubricant pump;
manifold means disposed downstream from said lubricant pump, said manifold means being in fluid communication with said conduit means for receiving said lubricant from said pump;
valve means in fluid communication with said manifold means for receiving pressurized lubricant delivered by said conduit means; and
a plurality of dispensing lines connected to asid valve means in fluid communication with said joint bearings for delivering pressurized lubricant to said joint bearings when said lubricant pump is energized.

24. The apparatus of claim 23 including an axial lubricating bore formed in at least a portion of said input shaft means, a transverse lubricating bore formed in said input shaft means communicating with said axial bore; and said conduit means includes a bridge conduit spanning an exterior portion of said input shaft means in fluid communication with said transverse bore and said manifold means for delivering pressurized lubricant to said manifold means.

25. The apparatus of claim 23 wherein said conduit means includes a first bridge conduit spanning said shaft coupling in fluid communication with said manifold means.

26. The apparatus of claim 25 wherein said conduit means includes a second bridge conduit in fluid communication with said lubricant pump means and said first bridge conduit.

27. The apparatus of claim 26 including a rotary shaft seal carried by said input shaft means having a non-rotary part connected to said second bridge conduit and a rotary part connected to said first bridge conduit and through which said bridge conduits communicate.

28. The apparatus of claim 23 wherein said valve means comprises a plurality of injector valves in fluid communication with said manifold mean for delivering a predetermined amount of lubricant to said bearings upon energization of said lubricant pump.

29. The apparatus of claim 23 wherein said manifold means comprises a collar mount carried about said connecting means for rotation with said connecting means; and said valve means comprise a plurality of injection valves carried by said collar mount which are manifolded and connected to said first bridge conduit and to said dispensing lines for distributing said lubricant to said shaft coupling.

30. The apparatus of claim 23 wherein said shaft coupling comprises:
a first yoke coupling having an input yoke attached to said input shaft means and an output yoke connected to said connecting means;
a second yoke coupling having an input yoke connected to said connecting means and an output yoke connected to said output shaft means; and
cross and bearing assemblies connecting said input and output yokes of said first and second yoke couplings each said bearing assembly having four of said joint bearings.

31. The apparatus of claim 30 wherein said cross and bearing assemblies include four cross arms having axial passages; and a plug means inserted in said passages of said cross arms to prevent communication between said passages so that pressurized lubricant admitted to said bearings is forced through said passages in a first direction until said plug means is reached and subsequently reversed direction to flow in a second opposite direction through said passages to purge air outwardly through said joint bearings.

32. A method of automatically lubricating a rotary drive while said drive is rotating, said drive being of the type which comprises an input shaft means; a first shaft coupling; a second shaft coupling connected to an output shaft means of said rotary drive and an intermediate connector means interconnecting said first and second shaft coupling wherein said method comprises:
providing a stationarily disposed pump for delivering a pressurized lubricant to said rotary drive;
providing a conduit means communicating with said pump and pressurized lubricant;
mounting a manifold means about said intermediate connector means downstream from said pump and in fluid communication with said conduit means for receiving said pressurized lubricant;
providing valve means for being connected to said manifold means in fluid communication therewith for receiving pressurized lubricant from said conduit means; and
connecting a plurality of dispensing lines to said valve means and to said shaft couplings for dispensing pressurized lubricant from said lubricant pump to said shaft couplings.

33. The method of claim 32 including automatically controlling said pump to continuously lubricate said rotary drive during operation.

34. The method of claim 33 including:
mounting a plurality of injection valves around said connecting means, and manifolding said injector valves by interconnecting said injector valves and said conduit means; and
connecting said dispensing lines between said injector valves and said first and second shaft couplings.

35. The method of claim 34 including:
providing said shaft couplings in the form of universal joint coupling having input and output yokes coupled by cross and arm bearings assemblies having a plurality of arms with a plurality of bearings at the ends of said arms; and connecting said bearings to said injector valves.

36. The method of claim 35 including plugging the axial passages of said arms to purge air from said cross and arms bearing assemblies during continuous automatic lubrication.

37. The method of claim 32 wherein said conduit means is provided by:

forming an axial passage in at least a portion of said input shaft means;

forming a transverse passage in said input shaft means in fluid communication with said axial passage; and providing a bridge conduit communicating with said transverse passage and said manifold means.

* * * * *